United States Patent

[11] 3,623,527

[72] Inventors Kevin B. O'Neil
Akron, Ohio;
Paul E. Helms, Jr., Fort Knox, Ky.
[21] Appl. No. 30,732
[22] Filed Apr. 22, 1970
[45] Patented Nov. 30, 1971
[73] Assignee The Goodyear Tire & Rubber Company
Akron, Ohio

[54] PNEUMATIC TIRE
16 Claims, 2 Drawing Figs.
[52] U.S. Cl............................................... 152/354,
152/361
[51] Int. Cl............................................... B60c 9/06,
B60c 9/18
[50] Field of Search............................................... 152/354,
359, 356, 361

[56] References Cited
UNITED STATES PATENTS
| 3,548,911 | 12/1970 | Rye | 152/359 |
| 3,516,465 | 6/1970 | Guyot | 152/361 |
| 2,987,095 | 6/1961 | Toulmin | 152/361 |
| 2,943,663 | 7/1960 | Antonson | 152/361 |
| 2,493,614 | 1/1950 | Bourdon | 152/361 |
| 2,976,905 | 3/1961 | Beckadolph | 152/361 |

Primary Examiner—Arthur L. La Point
Assistant Examiner—D. W. Keen
Attorneys—F. W. Brunner and Harlan E. Hummer ABSTRACT: A bias-belted tire having carcass, or tire body plies with reinforcing cords of polyester or nylon, and annular belts with metallic reinforcing cords circumferentially embedded in the area of the tread.

PATENTED NOV 30 1971

3,623,527

INVENTORS
KEVIN B. O'NEIL
BY PAUL E. HELMS, JR.

Harlan E. Hummer
ATTORNEY

PNEUMATIC TIRE

BACKGROUND OF THE INVENTION

The invention relates generally to pneumatic tires of a bias-belted-type construction, which employs a number of annular strips or belts with parallel cords for restricting, reinforcing, and consequently supporting the tire circumferentially. More particularly, the invention is concerned with a particular bias-belted design applicable to the production of heavier tires suitable for use on trucks and other large commercial vehicles.

Heretofore, truck tires have been built from numerous layers or plies of rubber material with reinforcing cords, some tires having as many as 20–40 plies. The cords reinforcing the tire carcass or body, usually extend radially, or on a bias between a pair of annular wire beads on which the tire is formed. In recent years, new tire-building techniques, especially the development of new and stronger reinforcing tire cords, have enabled tire builders to substantially reduce the large number of plies without adversely affecting the durability of the tire. The bias-belted tire construction, employed primarily in the production of tires for passenger cars, has been found well suited for larger truck tires, providing certain combinations of carcass plies, and annular reinforcing belts are used. The invention is directed to such a combination.

Briefly stated, the invention is in a bias-belted truck tire having a couple of carcass plies reinforced with angularly intersecting cords of nylon or polyester and at least one pair of belts with metallic reinforcing angular intersecting cords, the weight and corresponding size of the metallic cords being determined from a special formula hereinafter described.

DESCRIPTION OF THE DRAWING

The following description of the invention will be better understood by having reference to the annexed drawing, wherein.

DESCRIPTION OF THE INVENTION

Figure 1:
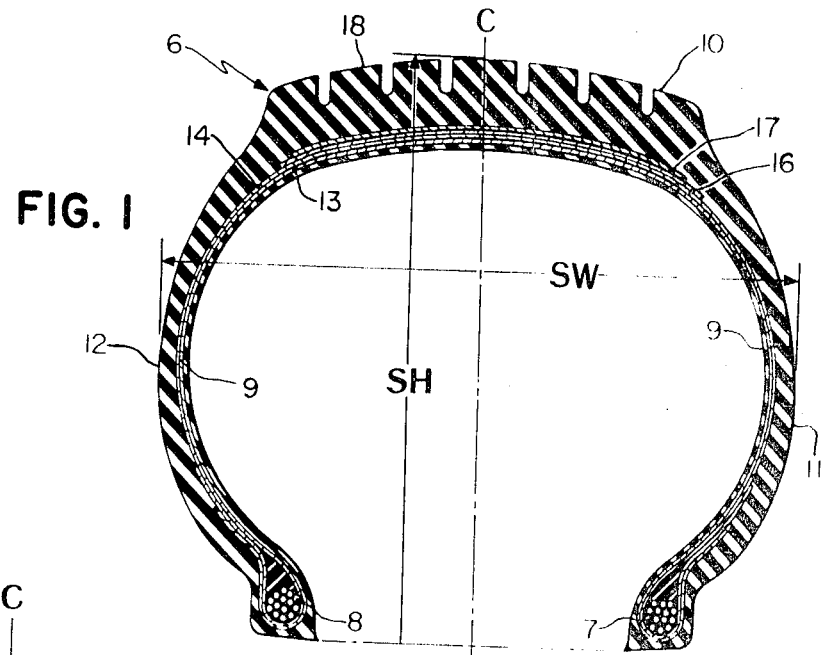
FIG. 1 is a cross section of a bias-belted pneumatic tire produced in accordance with the invention.
Figure 2:
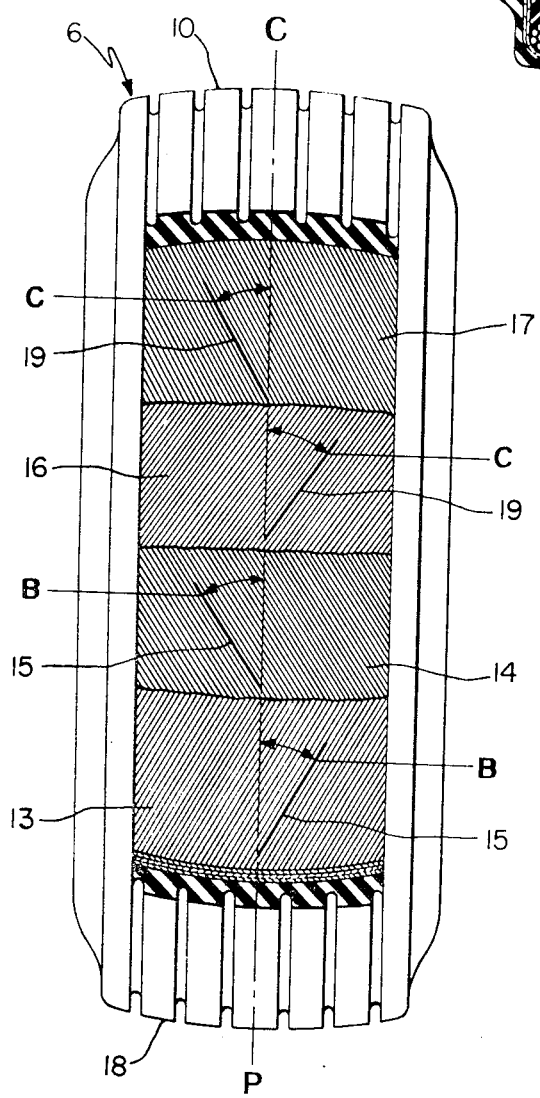
FIG. 2 is a sectional view of the tire illustrating the angular disposition and intersection of the cords for reinforcing the carcass plies and belts.

Referring more particularly to the drawing, there is shown a pneumatic tire, generally indicated at 6, suitable for use on cargo-carrying vehicles, e.g. trucks. The tire 6 can be tubeless having an air-impermeable innerliner for holding air under pressure, or of the type employing a separate innertube for holding air under pressure within the tire. The tire 6 comprises a pair of annular beads 7 and 8 mountable on a wheel rim; a bias ply tire body or carcass 9 extending between, and wrapped around the beads 7 and 8; an annular tread 10 carried by the tire carcass 9 in opposed relation to the beads 7 and 8 for riding engagement along a road or other surface; and a pair of sidewalls 11 and 12 which extend from the tread 10 and terminate at the beads 7 and 8.

The configuration of the pneumatic tire 6 is symmetrical from a plane C-P passing through the midcircumferential centerline of the tread 10, such plane being hereinafter referred to as the centerplane (CP) of the tire 6.

The tire carcass 9 includes a plurality of plies 13 and 14 composed of rubber material reinforced with a number of generally parallel cords, e.g. cord 15. The cords 15 of the carcass plies 13 and 14 are composed of either polyester or nylon. The tire cords 15 of the carcass plies 13 and 14, are disposed at angles B in the broad range of from about 28° to about 40° and in a preferred range of from about 28° to about 35° measured in opposite directions from the centerplane of the tire 6, when the tire is cured and uninflated.

A plurality of annular belts 16 and 17 are circumferentially embedded in the tire 6 in the area of the tread 10, preferably in closer spaced relation to the outer periphery 18 of the tread 10 than the carcass plies 13 and 14. The belts 16 and 17 are composed of rubber material reinforced with a number of generally parallel metallic cords, e.g. cords 19. The cords 19 are composed of any suitable wire, e.g. bronze-coated, brass-coated, or zinc-coated wire.

The wire cords 19 of the belts 16 and 17, are disposed at angles C in the broad range of from about 18° to about 36° and in a preferred range of from about 25° to about 30° measured in opposite directions from the centerplane of the tire 6, when the tire is cured and uninflated. The wire cords 19 of the belts 16 and 17 preferably have a minimum coating of about 0.0001 inches of rubberized material. The minimum rivet R or distance between adjacent wire cords 19 is preferably, about 0.004 inches. The size of the wire cords 19 is preferably, between about 700 Tex and about 4,000 Tex, Tex being a conventional term in the art used for expressing the weight of the cord in grams per 1,000 meters length of the cord. The minimum rubber gauge, or the radial spacing between adjacent cords 19 when the belts 16 and 17 are in juxtaposed radial spaced relation, is preferably between about 0.001 inches and about 0.3 inches.

The weight of the wire cords 19 placed in each of the belts 16 and 17 can be calculated from the formula:

$$W = K(TC/A); \quad \text{Formula I}$$

where $W$ is the weight of the wire in pounds; $T$ is the width of the tread in inches; $C$ is the circumference of the tire measured in inches along the midcircumferential centerline of the tread; $A$ is the aspect ratio of the tire 6, or the ratio of the section height ($SH$), measured in inches at the centerplane of the tire 6, to the section width ($SW$) measured in inches at the greatest width of the tire 6; and $K$ is a composite constant, defined in pounds per square inch, whose value should fall within the range of from about 0.002 to about 0.008, for acceptable belts. It has been found that the amount of wire is insufficient to carry the load, if the composite constant $K$ is less than about 0.002. Also, the wire cords and rubber coating tend to separate, if the composite constant $K$ is above about 0.008.

The measurements of $T$, $C$, $SH$, and $SW$, are taken when the tire is mounted on a wheel rim and inflated to a normal operating pressure. Moreover, the aspect ratio $A$ or ratio of the $SH$ to $SW$ is in relation to a wheel rim having a spacing between its upstanding flanges equal to about 70 percent of the section width $SW$. The section width $SW'$ of the tire when mounted on a different test rim, can be converted to the $SW$ of the aforementioned 70-percent wheel rim from the formula:

$$SW = SW' \left[ \frac{180 - \arcsin\left(\frac{W}{SW'}\right)}{135.6} \right]$$

Formula II where $W$ is the distance, measured in inches, between the upstanding flanges of the actual test rim; and $SW'$ is the actual section width, measured in inches, of the tire on the test rim.

Thus, there has been provided a new and novel bias-belted tire suitable for use on trucks and other commercial vehicles. The term "bias-belted tire" as used in the following claims, has reference to a tire having carcass plies and belts with reinforcing cords angularly disposed at angles within the aforementioned ranges.

While certain representative embodiments and details have been shown for the purpose of illustrating the invention, it will be apparent to those skilled in the art that various changes and modifications may be made therein without departing from the spirit or scope of the invention.

We claim:

1. A bias-belted pneumatic tire comprising in combination:
   a. a pair of carcass plies having reinforcing cords disposed at angles B of from about 28° to about 40° measured in opposite directions from the centerplane of the tire, when the tire is cured and uninflated; and
   b. a pair of belts circumferentially embedded in the tire in the area of the tread for reinforcing the tire annularly, the belts having metallic reinforcing cords disposed at angles C of from about 16° to about 35° measured in opposite directions from the centerplane of the tire, when the tire is cured and uninflated, the weight W, in pounds, of the metallic cords of each belt being equal to:

$$K(TC/A); \text{ Formula I}$$

where T is the width (inches) of the tread when the tire is inflated to a normal operating pressure; C is the circumference (inches) of the tire measured around the midcircumferential centerline of the tread when the tire is inflated to a normal operating pressure; A is the ratio of the SH to the SW in relation to a wheel rim having a spacing between its upstanding flanges equal to about 70 percent of the section width SW; and K is a composite constant (lbs./in.$^2$) in the range of from about 0.002 to about 0.008.

2. The tire of claim 1, wherein the size of the metallic cords is from about 700 Tex to about 4,000 Tex.

3. The tire of claim 1, wherein the rivet (R) between the metallic cords is not less than about 0.004 inches.

4. The tire of claim 1, wherein the radial spacing between metallic cords of adjacent belts is from about 0.001 to about 0.3 inches.

5. The tire of claim 1, wherein the metallic cords are wire selected from the group consisting of brass-coated steel wire, bronze-coated steel wire and zinc-coated steel wire.

6. The tire of claim 1, wherein the cords in the carcass plies are polyester.

7. The tire of claim 1, wherein the cords in the carcass plies are nylon.

8. The tire of claim 1, wherein the angles B are in the preferred range of from about 28° to about 35°.

9. The tire of claim 8, wherein the angles C are in the preferred range of from about 25° to about 30°.

10. A bias-belted pneumatic tire comprising in combination:

a. a pair of carcass plies having polyester reinforcing cords disposed at angles B of from about 28° to about 50° measured in opposite directions from the centerplane of the tire, when the tire is cured and uninflated; and b. a pair of belts circumferentially embedded in the tire in the area of the tread for reinforcing the tire annularly, the belts having metallic reinforcing cords disposed at angles C of from about 16° to about 35° measured in opposite directions from the centerplane of the tire when the tire is cured and uninflated, the weight W, in pounds, of the metallic cords being equal to:

$$K(TC/A); \text{ Formula I}$$

where T is the width (inches) of the tread when the tire is inflated to a normal operating pressure; C is the circumference (inches) of the tire measured around the midcircumferential centerline of the tread when the tire is inflated to a normal operating pressure; A is the ratio of the SH to the SW in relation to a wheel rim having a spacing between its upstanding flanges equal to about 70 percent of the section width SW; and K is a composite constant (lbs./in.$^2$) in the range of from about 0.002 to about 0.008.

11. The tire of claim 10, wherein the size of the metallic cords is from about 700 Tex to about 4,000 Tex.

12. The tire of claim 11, wherein the rivet between the metallic cords is not less than about 0.004 inches.

13. The tire of claim 12, wherein the metallic cords are wire taken from the group consisting of brass-coated steel wire, bronze-coated steel wire and zinc-coated steel wire.

14. The tire of claim 13, wherein the radial spacing between metallic cords of adjacent belts is from about 0.001 to about 0.3 inches.

15. The tire of claim 14, wherein the angles B are in the preferred range of from about 28° to about 35°.

16. The tire of claim 15, wherein the angles C are in the preferred range of from about 25° to about 30°.

* * * * *